(12) United States Patent
Kiselev

(10) Patent No.: US 11,002,654 B2
(45) Date of Patent: May 11, 2021

(54) METHOD AND DEVICE FOR DETECTION AND/OR MORPHOLOGIC ANALYSIS OF INDIVIDUAL FLUID-BORNE PARTICLES

(71) Applicant: PLAIR SA, Plan-les-Ouates (CH)

(72) Inventor: Denis Kiselev, Perly (CH)

(73) Assignee: PLAIR SA, Plan-les-Ouates (CH)

( * ) Notice: Subject to any disclaimer, the term of this patent is extended or adjusted under 35 U.S.C. 154(b) by 162 days.

(21) Appl. No.: 16/072,548

(22) PCT Filed: Jan. 10, 2017

(86) PCT No.: PCT/EP2017/050376
§ 371 (c)(1),
(2) Date: Jul. 25, 2018

(87) PCT Pub. No.: WO2017/129390
PCT Pub. Date: Aug. 3, 2017

(65) Prior Publication Data
US 2019/0033191 A1 Jan. 31, 2019

Related U.S. Application Data

(60) Provisional application No. 62/286,589, filed on Jan. 25, 2016.

(51) Int. Cl.
*G01N 15/02* (2006.01)
*G01N 15/14* (2006.01)
(Continued)

(52) U.S. Cl.
CPC ..... *G01N 15/0211* (2013.01); *G01N 15/1459* (2013.01); *G01N 2015/1075* (2013.01);
(Continued)

(58) Field of Classification Search
CPC .......... G01N 15/0211; G01N 15/1459; G01N 2015/1075; G01N 2015/1497; G01N 2021/4714
(Continued)

(56) References Cited

U.S. PATENT DOCUMENTS 4,643,566 A * 2/1987 Ohe .................. G01N 15/1459
356/317
4,906,094 A * 3/1990 Ashida ............... G01N 15/0205
356/246
(Continued)

FOREIGN PATENT DOCUMENTS

WO 2002101339 A2 12/2002

*Primary Examiner* — Tri T Ton
(74) *Attorney, Agent, or Firm* — Dinsmore & Shohl LLP

(57) ABSTRACT

Measurement device and methods for the detection and/or analysis of fluid-borne particles. The measurement device comprises a means for producing a flow of fluid along a fluid flow path, a laser positioned for emitting a beam of laser light in a measurement volume of the fluid flow path; a lens set for collecting laser light scattered in the measurement volume by fluid-borne particles contained in the flow of fluid; a multipixel photo-detector positioned for detecting scattered laser light collected by the lens set. The lens set is configured for focusing the scattered light in a line being perpendicular to a flow direction (y) of the flow of fluid and at a focal distance of the lens set. The multipixel photodetector is positioned at a distance from the focal distance of the lens set and oriented with its longitudinal axis parallel to the line.

18 Claims, 7 Drawing Sheets

(51) Int. Cl.
  *G01N 15/10* (2006.01)
  *G01N 21/47* (2006.01)
(52) U.S. Cl.
  CPC ............... *G01N 2015/1497* (2013.01); *G01N 2021/4714* (2013.01)
(58) Field of Classification Search
  USPC ................................................ 356/335–343
  See application file for complete search history.

(56) References Cited

U.S. PATENT DOCUMENTS

| | | | |
|---|---|---|---|
| 7,656,526 B1 * | 2/2010 | Spuler | G01N 21/538 356/336 |
| 2005/0151968 A1 | 7/2005 | Drake | |
| 2007/0146703 A1 * | 6/2007 | Adams | G01N 15/1429 356/337 |
| 2011/0000560 A1 | 1/2011 | Miller | |

* cited by examiner

METHOD AND DEVICE FOR DETECTION AND/OR MORPHOLOGIC ANALYSIS OF INDIVIDUAL FLUID-BORNE PARTICLES

The present invention relates to a method and a device for the detection and/or morphologic analysis of individual fluid-borne particles. The present invention relates in particular to a method and a device for the detection and/or morphologic analysis of individual fluid-borne particles, for example airborne or liquid-borne particles, by timely resolved multi-pixel light scattering.

The present invention relates, in particular but not exclusively, to the fields of hazardous fluid-borne particles detection and/or analysis, air or water pollution detection, air or water bio and/or chemical contamination detection, and/or airborne allergen detection. The growing concentration of different types of aerosols in the atmosphere, for example, becomes more and more an important issue. Their specific influence on the climate change and air quality is still an open question. Moreover, new threats like bio-terrorism that employs biological particles as a weapon of massive destruction have recently appeared. Reliable and cost-effective aerosol and/or water pollution detectors, fast and with a high discrimination power, are thus highly desirable in the market.

Particular species of aerosol particles, like pollens and spores, have a large impact on human health. Some of them are responsible for health problems like allergies affecting, according to statistical analysis, about 20% of the European population.

The counting of these particles is still done mostly manually under microscope. The size of airborne particles range from fractions of micrometer to some hundreds of micrometers, which brings an additional difficulty in particle detection and identification.

Measurement devices and methods for the detection of airborne particles exist, that allow estimating the size of particles contained in an aerosol based on the measurement of light scattered by individual particles. These devices and methods use a source of light (laser, laser diode, LED, etc.) directed to a flow of air, and a photodetector collecting light scattered by individual airborne particles over a large angle, or, in some cases, multiple or array detectors (1D or 2D) for collecting scattered light independently in different directions from the particle. The collected scattered light provides for a static representation of the airborne particle. The single-detector devices allow only very limited determination of single particle morphology and surface structure, while the devices with multiple or array detectors usually allow a more precise determination of these parameters.

The information about particle morphology and surface structure that can be obtained from a static picture of a particle is however limited. There is thus a need for measurement devices and methods for the detection and/or morphological analysis of fluid-borne particles that could provide information on the dynamics of the fluid-borne particles.

Some measurement devices and methods also allow measuring the speed of individual airborne particles by determining their flight time between two measurement points that are at a given distance from each other along the airflow.

The speed measurement allows direct estimation of aerodynamic particle size and thus provides additional information on the particle itself. These measurement devices and methods however require the use of two sources of light and two sets of photodetectors, which considerably increases their costs.

An aim of the present invention is thus to provide a device and a method for the detection and/or morphological analysis of fluid-borne particles that allow determining the speed of fluid-borne particles in a reliable and cost-effective manner.

Another aim of the present invention is to provide a device and a method for the detection and/or morphological analysis of fluid-borne particles that allow obtaining information about the dynamic behavior of the particles in the fluid flow in a reliable and cost-effective manner.

Still another aim of the present invention is to provide a device and a method for the detection and/or morphological analysis of fluid-borne particles that allow obtaining advanced and accurate information on the fluid-borne particles' morphology, surface and/or structure in a cost-effective manner.

These aims and other advantages are achieved with a device and a method according to the corresponding independent claims.

These aims and other advantages are achieved in particular with a measurement device for the detection and/or analysis of fluid-borne particles, the measurement device comprising means for producing a flow of fluid along a fluid flow path, a laser positioned for emitting a beam of laser light in a measurement volume of the fluid flow path; a lens set for collecting laser light scattered in the measurement volume by fluid-borne particles contained in the flow of fluid, a photo-detector positioned for the detection of scattered laser light collected by the lens set, wherein the lens set is configured for focusing the scattered light in a line at a focal distance (f2) of the lens set (3), said line being transverse, preferably perpendicular, to a flow direction (y) of the flow of fluid in said measurement volume; the photo-detector is a linear multipixel detector for capturing the laser light focused by the lens set, wherein said linear multipixel detector is positioned at a distance from the focal distance of the lens set and oriented with its longitudinal axis parallel to said line.

In embodiments, the means for producing a flow of fluid is a nozzle for producing a laminar flow of air with a flow path beyond the nozzle.

In other embodiments, the means for producing a flow of fluid comprises a tube for producing a flow of liquid with a flow path along said tube.

In embodiments, the lens set is configured for focusing the scattered light in a line by focusing the rays of scattered light in a direction parallel to the flow direction and making the rays of scattered light parallel to each other in a plane perpendicular to the flow direction.

In embodiments, the laser is configured for emitting a beam of laser light polarized in the flow direction. Optionally, the device of the invention then comprises a beam linear polarizer positioned in the path of the laser beam between the laser and the measurement volume to allow only linear polarization of the laser light in the flow direction to reach the measurement volume.

In embodiments, the lens set comprises a plano-convex cylindrical optical lens positioned for focusing the rays of scattered light in a direction parallel to the flow direction and for leaving the rays of the scattered light unchanged in a direction perpendicular to the flow direction.

In embodiments, the lens set further comprises a plano-convex spherical optical lens positioned between the measurement volume and the cylindrical optical lens, such that the focal point of the plano-convex spherical optical lens is located in the measurement volume.

In embodiments, the measurement device further comprises a scattered light linear polarizer positioned between the plano-convex spherical optical lens and the plano-convex cylindrical optical lens for keeping only parallel component light from the scattered light collected by the plano-convex spherical optical lens.

In embodiments, the measurement device further comprises a first diaphragm positioned between the plano-convex spherical optical lens and the plano-convex cylindrical optical lens for avoiding range effects of the plano-convex spherical and cylindrical optical lenses and/or for avoiding parasite light to be collected by the plano-convex cylindrical optical lens.

In embodiments, the photo-detector is configured to sample the laser light focused by the lens set at a sampling interval at least ten times shorter than the time of crossing the measurement volume by an individual fluid-borne particle of the smallest size measured by the measurement device. The sampling interval is for example at least ten times shorter than a travel time of the fluid in the measurement volume, said travel time corresponding to a size of the laser beam in the measurement volume in the flow direction, divided by a speed of the fluid flow in the measurement volume.

The photo-detector is for example configured to sample the laser light focused by the lens set at a sampling rate higher or equal to one, 5, 10 or even 25 MSPS (Mega Sample Per Second).

In embodiments, the measurement device further comprises a second diaphragm positioned between the set of lens and the photo-detector for avoiding parasite light from being captured by the photo-detector.

These aims and other advantages are also achieved in particular with a measurement method for the detection and/or analysis of fluid-borne particles, comprising the steps of producing a flow of fluid along a fluid flow path, said flow of fluid potentially containing fluid-borne particles to be detected; emitting a beam of laser light in a measurement volume of the fluid flow path; collecting laser light scattered in the measurement volume by fluid-borne particles contained in the flow of fluid and focusing said scattered light in a line at a focal distance, said line being perpendicular to a flow direction of the flow of fluid in the measurement volume; capturing the collected and focused scattered laser light with a linear multipixel photo-detector positioned at a distance from the focal distance and oriented with its longitudinal axis parallel to the line; repeating the steps of emitting, collecting and capturing a plurality of times during the time of crossing the measurement volume by an individual fluid-borne particle of the smallest size measured by the measurement method.

In embodiments, the flow of fluid is a laminar flow of air.

In other embodiments, the flow of fluid is a flow of liquid or gas, preferably transparent to laser light.

In embodiments, the beam of laser light is polarized in the flow direction.

In embodiments, focusing the collected scattered light in a line comprises focusing the rays of collected scattered light in a direction parallel to the flow direction and making them parallel to each other in a direction perpendicular to the flow direction.

In embodiments, the steps of emitting, collecting and capturing are repeated at least ten times during the time of crossing the measurement volume by an individual fluid-borne particle of the smallest size measured by the measurement method.

The steps of emitting, collecting and capturing are repeated for example at a sampling rate higher or equal to one, 5, 10 or even 25 MSPS (Mega Sample Per Second).

In embodiments, scattered laser light captured during the crossing of the measurement volume by a fluid-borne particle is further used for determining for example a size of the fluid-borne particle, a speed of the fluid-borne particle across the measurement volume, a shape of the fluid-borne particle and/or a surface quality of the fluid-borne particle.

The present invention will be better understood by reading the following description illustrated by the figures, where:

Figure 5A:
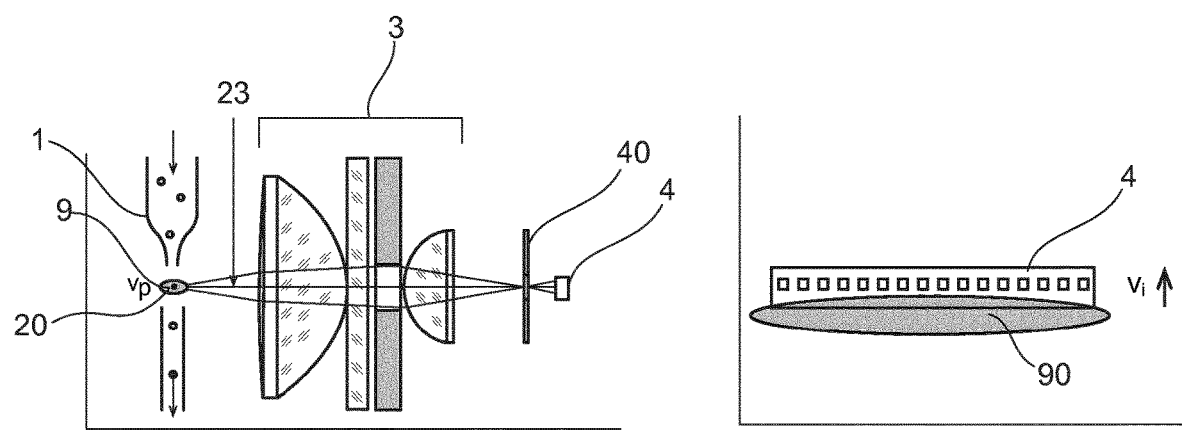
Figure 5B:
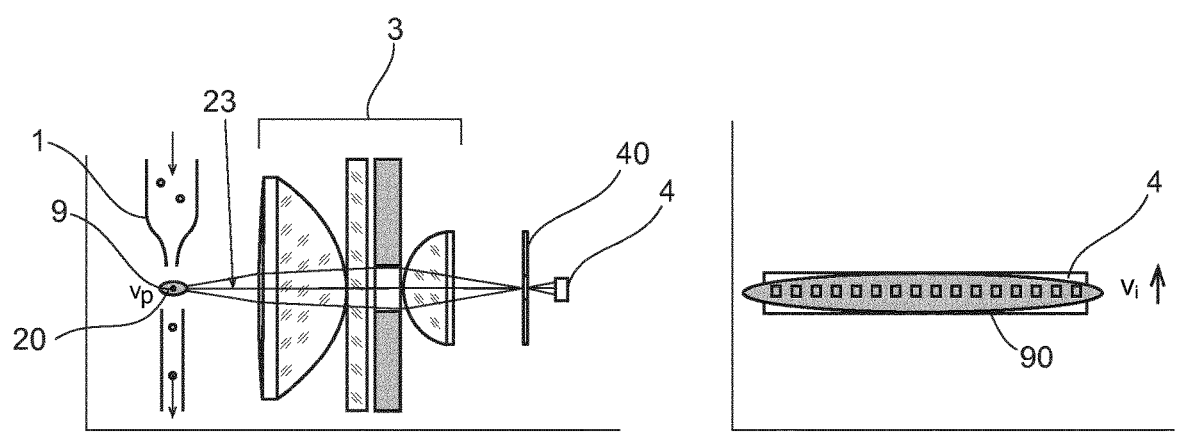
Figure 5C:
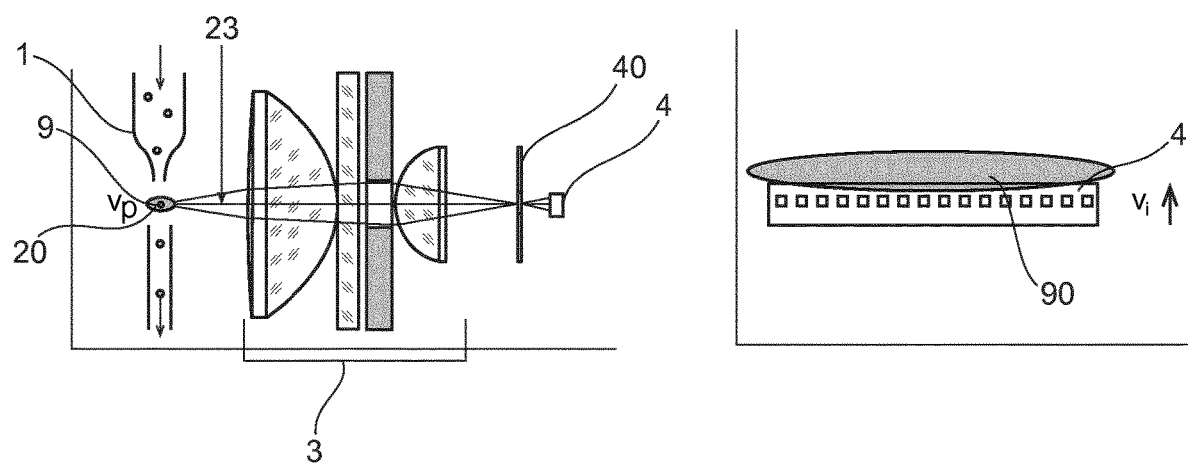
Figure 6:
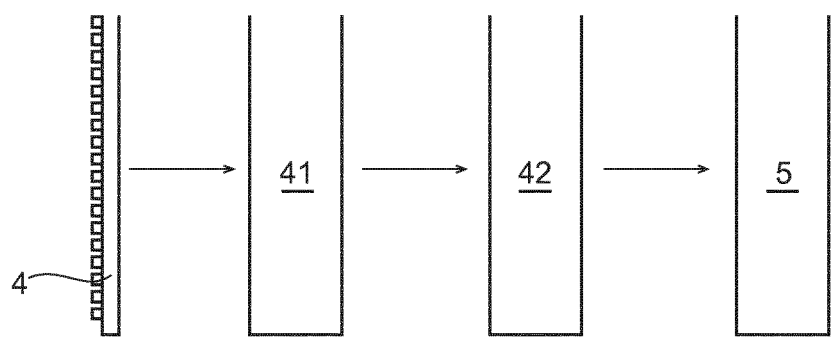
Figure 7A:
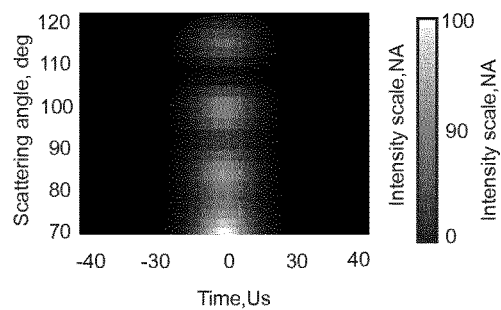
Figure 7B:
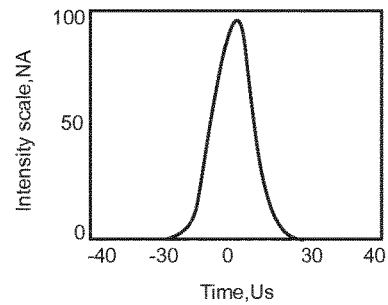
Figure 7C:
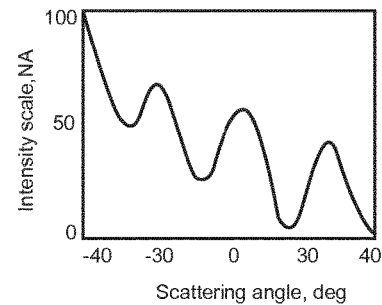

FIGS. 5a, 5b and 5c schematically illustrate how the linear photodetector of the device of the invention captures light scattered by a fluid-borne particle while the fluid-borne particle crosses the measurement volume;

FIG. 6 is a flow chart schematically illustrating the processing of the images captured by the linear photodetector of the device of the invention;

FIG. 7a shows an example of a time-angle scattering diagram captured by the linear photodetector of the device of the invention when a fluid-borne particle crosses the measurement volume;

FIG. 7b shows an example of a time profile of the sum over all pixels of the scattered light captured by the linear photodetector of the device of the invention when a fluid-borne particle crosses the measurement volume;

FIG. 7c shows an example of an angular profile of the maxima of all pixels of the scattered light captured by the linear photodetector of the device of the invention when a fluid-borne particle crosses the measurement volume;

FIGS. 8a to 8f show the correspondence between the time-resolved scattering diagrams obtained by a device according to the invention and static 2D patterns acquired by a prior art device with a two-dimensional photodetector.

Figure 1:
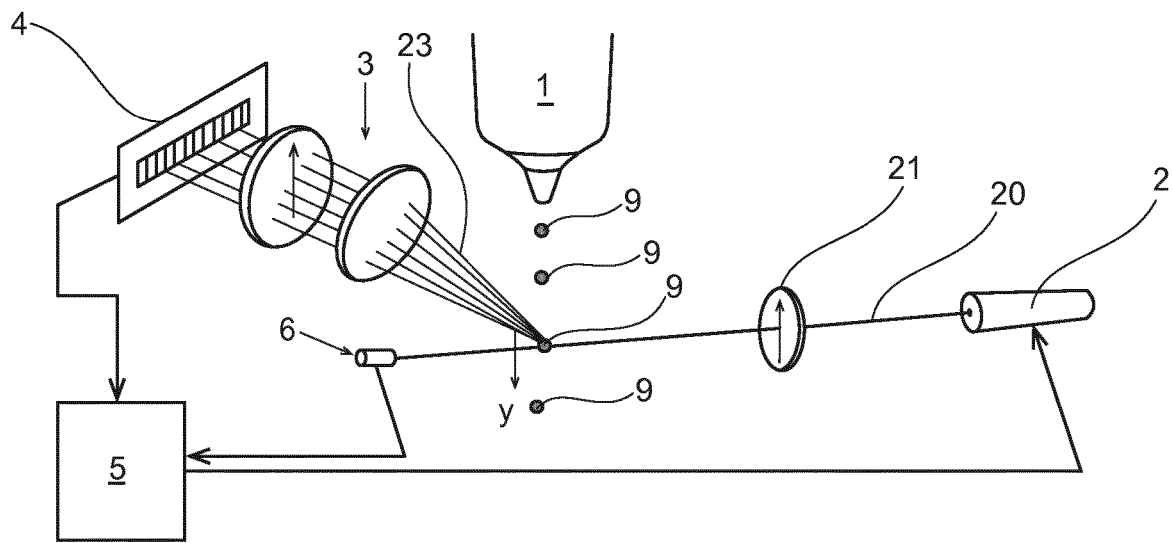
FIG. 1 is a schematic illustration of an embodiment of the device of the invention for the detection of airborne particles.
Figure 2A:
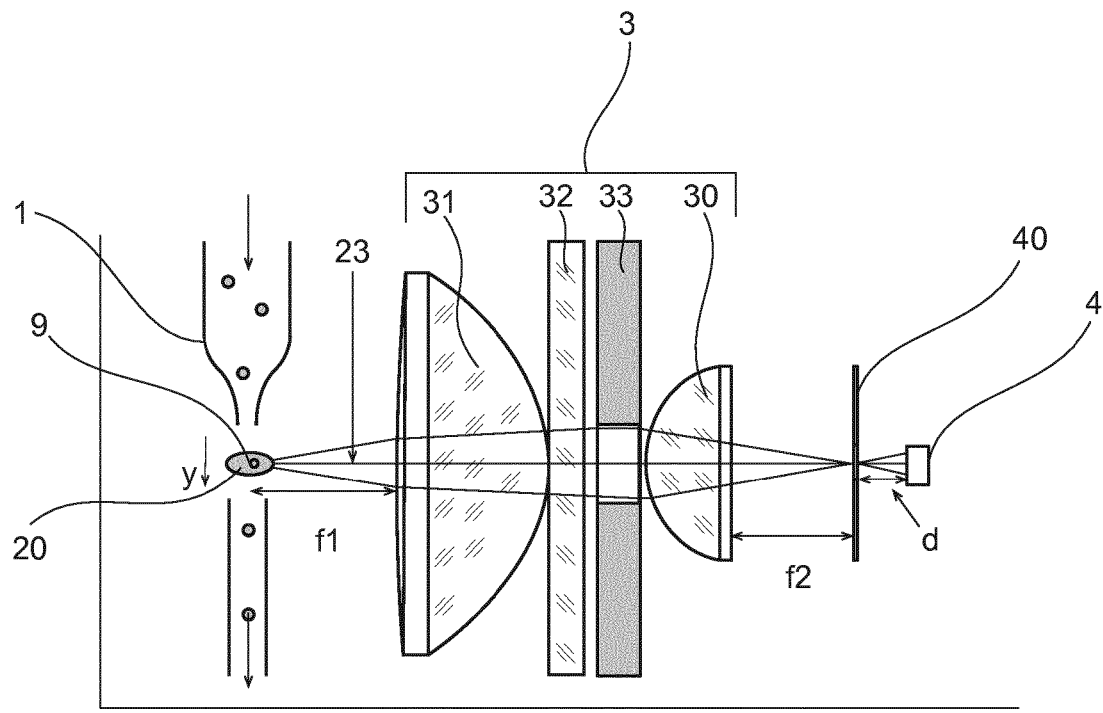
FIG. 2a is a detailed vertical cut view of the device of FIG. 1.
Figure 2B:
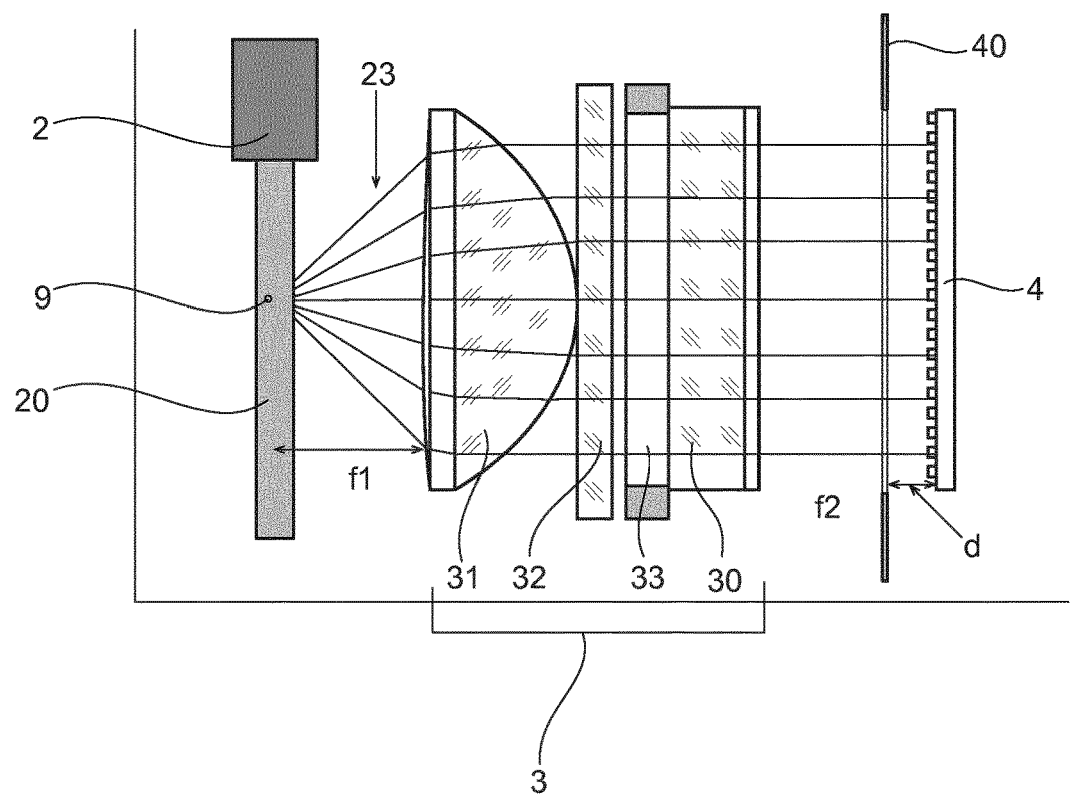
FIG. 2b is a detailed horizontal cut view of the device of FIG. 1.

In embodiments, and with reference to FIGS. 1, 2a and 2b, the device of the invention is configured for the detection and/or morphological analysis of airborne particles contained in a flow of air.

With reference to FIG. 1, the device comprises a nozzle 1 for producing a laminar flow of air along a flow path beyond the nozzle 1, wherein the laminar flow of air potentially contains individual aerosol particles 9. The flow direction y of the flow path is for example vertical.

The device further comprises a source of light, for example a laser 2, for example a 660 nm continuous wavelength (CW) laser, which is positioned for emitting a beam 20 of light towards the airflow. The laser light is preferably polarized along the flow direction y, for example in a vertical direction. Optionally, a linear polarizer 21 is positioned in the beam 20 of light, between the emitting laser 2 and the flow of air, to insure that only light polarized in the flow direction y, for example vertically polarized light, passes further and reaches the airflow.

The intersection of the beam 20 of laser light with the airflow defines a measurement volume in which airborne particles 9 cross the laser beam 20 in the flow direction y, the flow direction y corresponding to the direction of the airflow in the measurement volume. The laser beam 20 is thus at least partly scattered by the individual particles 9 crossing the measurement volume and the scattered light 23 is at least partly collected by an optical lens set 3 and then captured by a photodetector 4 of the device of the invention.

According to the invention, and with reference to FIGS. 2a and 2b, the lens set 3 is configured for converging, or focusing, the rays of collected scattered light 23 in a line, for example by focusing the rays of collected scattered light 23 in a direction parallel to the flow direction y, for example in a vertical direction, and for aligning the rays of the collected scattered light 23 parallel to each other in a direction transverse, preferably perpendicular, to the flow direction y, for example in a horizontal direction. In embodiments, the lens set 3 for example comprises a cylindrical optical lens. The cylindrical optical lens is for example positioned with its longitudinal axis transverse, preferably perpendicular, to the flow direction y for converging the rays of collected scattered light 23 in a direction parallel to the flow direction y while leaving the rays of collected scattered light 23 unchanged in a direction transverse, preferably perpendicular, to the flow direction y. Other configurations of the lens set 3, in particular the use of other optical lenses or devices, are however possible within the frame of the invention for focusing the collected scattered light 23 at a focal distance f2 of the lens set 3 in a line perpendicular to the flow direction y.

In embodiments, and with reference to the figures, the lens set 3 for example comprises a plano-convex cylindrical optical lens 30, positioned with its convex side oriented towards the measurement volume and its planar side oriented towards the photodetector 4. The lens set 3 further comprises for example a plano-convex spherical optical lens 31 positioned between the measurement volume and the plano-convex cylindrical optical lens 30 for aligning the rays of the collected scattered light 23 parallel to each other in all directions before directing them to the plano-convex cylindrical optical lens 30. The plano-convex spherical optical lens 31 is for example positioned with its planar side oriented towards the measurement volume and its convex side oriented towards the plano-convex cylindrical optical lens. The plano-convex spherical optical lens 31 is positioned such that its focal point is conjugated with, or located in, the center of the measurement volume, in other words, the distance between the plano-convex spherical optical lens 31 and the center of the measurement volume is equal to the focal distance f1 of the plano-convex spherical optical lens 31. In embodiments, the plano-convex cylindrical optical lens 30 is oriented with its longitudinal axis perpendicular to the flow direction y, for example horizontal, in order to focus the collected scattered light 23 in a line perpendicular to the flow direction y at the focal distance f2 of the plano-convex cylindrical optical lens 30.

The lens set 3 of the device of the invention thus builds an imaging system that focuses rays of scattered light from the measurement volume in a line parallel to the flow direction y, for example by focusing the rays of collected scattered light in a direction parallel to the flow direction y while aligning the rays of collected scattered light parallel to each other in a direction perpendicular to the flow direction y. In embodiments, for example, scattered light 23 scattered in the measurement volume by individual particles 9 crossing the laser beam 20 in the flow direction y is collected by the plano-convex spherical optical lens 31. The focal point of the plano-convex spherical optical lens 31 being conjugated with the center of the measurement volume, the rays of collected scattered light 23 are aligned parallel to each other beyond the plano-convex spherical optical lens 31, i.e. as if focused at an infinite focal distance. The collected scattered light 23 is then directed towards the plano-convex cylindrical optical lens 30 which, due to its shape and position, has an infinite focal distance in a plane perpendicular to the flow direction y, for example in a horizontal plane, and a finite focal distance f2 in a plane parallel to the flow direction y, for example in a vertical plane. The rays of scattered light 23 exiting the plano-convex cylindrical optical lens 30 thus remain parallel to each other in a direction perpendicular to the flow direction y, for example in a horizontal direction, while converging in a direction parallel to the flow direction y, for example in a vertical direction.

The lens set 3 is described above essentially as the combination of a plano-convex cylindrical optical lens 30 and a plano-convex spherical optical lens 31. Other optical means, in particular other optical lens combinations, are however possible within the frame of the invention for collecting at least part of the light scattered by individual particles 9 in the measurement volume and for converging the rays of collected light in a line.

In embodiments, the lens set 3 further comprises means for filtering out parasitic light and, in embodiments, for filtering out scattered light that is not polarized along the flow direction y, and/or for shaping the image formed by the imaging system. In embodiments, the lens set 3 for example comprises a linear polarizer 32 for filtering out light that is not polarized in the flow direction y and thus keeping only parallel component, or p-polarized, scattered light 23. Optionally, the lens set 3 further comprises a diaphragm, or pinhole, 33 for shaping the image formed by the lens set 3 and optionally for avoiding margin effects of the optical lenses. The opening of the diaphragm 33 is for example a rectangle opening whose shape and size determines the shape and size of the image projected by the lens set 3 at the focal distance f2 of the plano-convex cylindrical optical lens 30. The opening of the diaphragm 33 is for example rectangular with its longer side oriented for example in a direction perpendicular to the flow direction y.

According to the invention, the photodetector 4 is a multipixel photodetector, preferably a linear multipixel photodetector, for example a linear array sensor consisting of a linear array of integrating photosensing pixels. Each photosensing pixel of the linear photodetector measures incident light over a given exposure time and generates a voltage or digital output that represents the light exposure of the corresponding pixel. According to the invention, the photodetector 4 is not positioned in the focal plane of the lens set 3, but at a non-zero distance d from the focal distance f2, for example at a non-zero distance d beyond the focal distance f2 of the lens set 3. According to the invention, the image formed by the imaging system 3 of the invention is elongated and comprises a long dimension, or length, in a direction perpendicular to the flow direction y, for example in a horizontal direction, and a smaller dimension, or height, in a direction perpendicular to the flow direction y, for example in a vertical direction. The length of the projected image depends on the size and configuration of the elements of the imaging system 3 in the corresponding direction. In embodiments, the length of the projected image is for example equal to the dimension of the pinhole, or diaphragm, 33 in the same direction. The size, or length, of the linear photodetector 4 is thus preferably chosen to be at least as long as the length of the image so as to be able to capture the entire length of the image projected by the lens set 3. The height of the image at the position of the photodetector 4, i.e. at a distance d from the focal plane of the lens set 3, can be calculated for example as the dimension of the pinhole, or diaphragm, 33 in the same direction, multiplied by the distance d and divided by the focal distance f2 of the lens set 3, in particular of the cylindrical optical lens 30.

Optionally, the device of the invention further comprises a second diaphragm 40 between the lens set 3 and the photodetector 4 for filtering out parasitic light and/or shaping the image projected by the lens set 3 in the focal plane. The second diaphragm 40 is for example positioned in the focal plane of the lens set 3, i.e. at the focal distance f2 from the lens set 3.

The device of the invention preferably further comprises a signal analyzer 5 for receiving output signals from the photodetector 4 and using them for providing information to a user, such as for example a timely resolved scattering pattern of the particle 9 that scattered the collected and captured light, an indication of the speed of the particle 9, etc., as explained further below. In embodiments, the device of the invention comprises a photodetector, for example a photodiode 6 for detecting the laser beam 20 emitted by the laser 2 beyond the measurement volume. The output signal of the photodiode 6 is for example transmitted to signal analyzer 5 that can thus be informed of the presence or the absence of the laser beam 20. In addition, the photodiode 6 preferably allows continuous measurement of the intensity fluctuations of the laser beam, which can then be used to correct, or to adjust, the signals measured by the photodetector 4. In embodiments, the signal analyzer 5 generates control signals for controlling the laser 2, in particular the emission or not of a laser beam 20.

According to the invention, the lens set 3 focuses the collected scattered light 23 in a line perpendicular to the flow direction y, in order to obtain a line image representative of a linear sector of the particle that scattered the collected light, which is perpendicular to the direction of travel of the particle in the measurement volume, i.e. perpendicular to the flow direction y. As explained further below, successive line images of an individual particle captured during its crossing of the measurement volume thus allows reconstructing a two-dimensional image of the particle. In the present application, the expressions "parallel to the flow direction y" and "perpendicular to the flow direction y" must therefore be understood as meaning respectively parallel and perpendicular to the physical flow direction, as long as the imaging system doesn't apply a rotation to the collected scattered light and thus to the formed line image. If the imaging system rotates the collected scattered light, the expressions "parallel to the flow direction y" and "perpendicular to the flow direction y", when applied to the line image and/or to elements within or after the imaging system, must be understood respectively as meaning parallel or perpendicular to the direction of the fluid rotated by the rotation applied to the scattered light within or after the imaging system.

In preferred embodiments, the light of the laser beam 20 emitted by the laser 2 is polarized in a flow direction y that corresponds to the direction of the fluid flow along the fluid flow path in the measurement volume. In other embodiments, however, the laser light is unpolarised, circularly polarized, elliptically polarized or linearly polarized with a certain angle to the flow direction.

Unpolarized, circularly polarized or partially polarized light can be represented as a sum of vertically and horizontally polarized components. When the unpolarised light is scattered by an individual particle in the measurement volume, each component will produce its own scattering pattern, i.e. a specific distribution of scattered light intensity as a function of the scattering angle. Scattering unpolarised light, the scattering patterns of all components will overlap on the photodetector 4 and reduce the precision of particle sizing and shape measurements. Even if a linear polarizer is placed in front of the photodetector 4, it will not allow separating completely the various scattering patterns.

For the above reasons, linearly polarized laser is preferred for the light scattering based device and method of the invention.

The direction of polarization is preferably perpendicular to the longitudinal axis of the linear photodetector 4, i.e. parallel to the flow direction y, because the scattered polarized light will be seen as polarized in the polarization direction independently of the observation angle.

Figure 3:
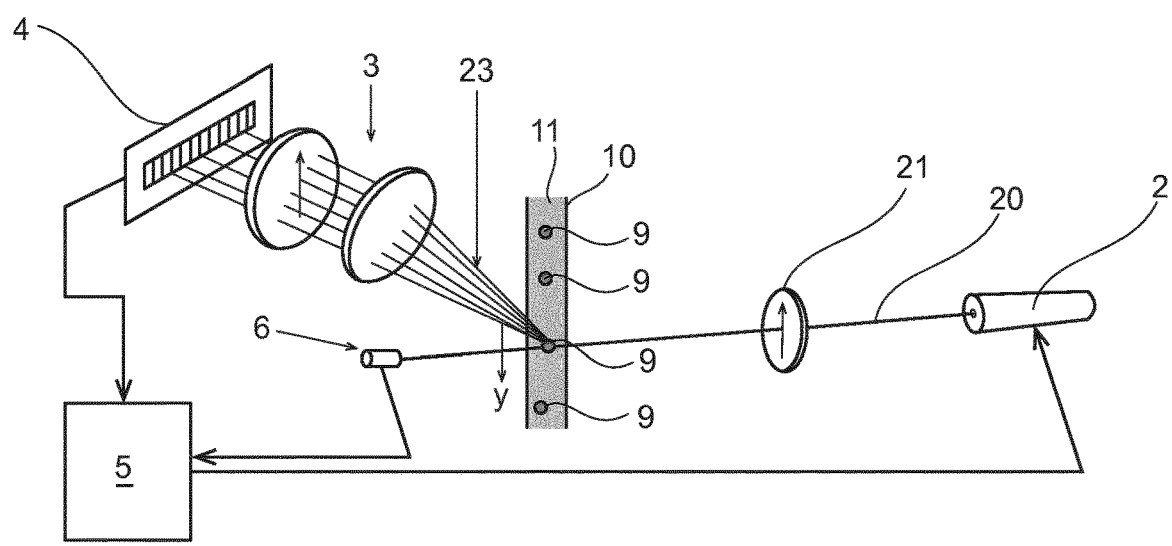
FIG. 3 is a schematic illustration of an embodiment of the device of the invention for the detection of liquid-borne particles.
Figure 4A:
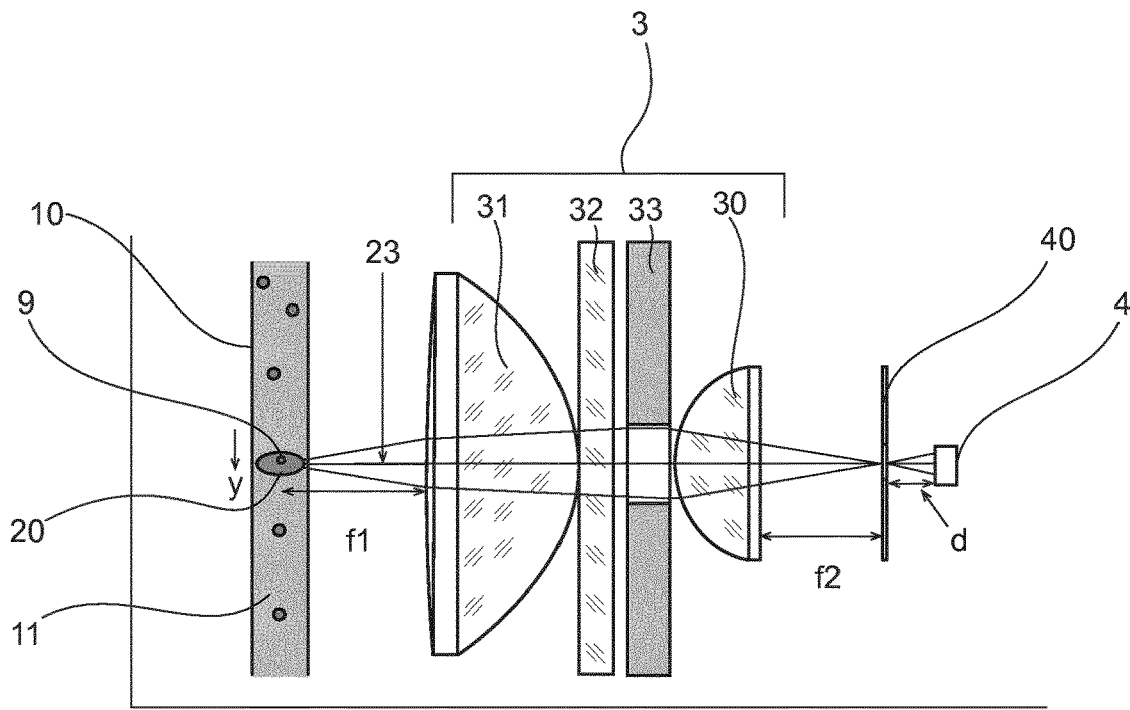
FIG. 4a is a detailed vertical cut view of the device of FIG. 3.
Figure 4B:
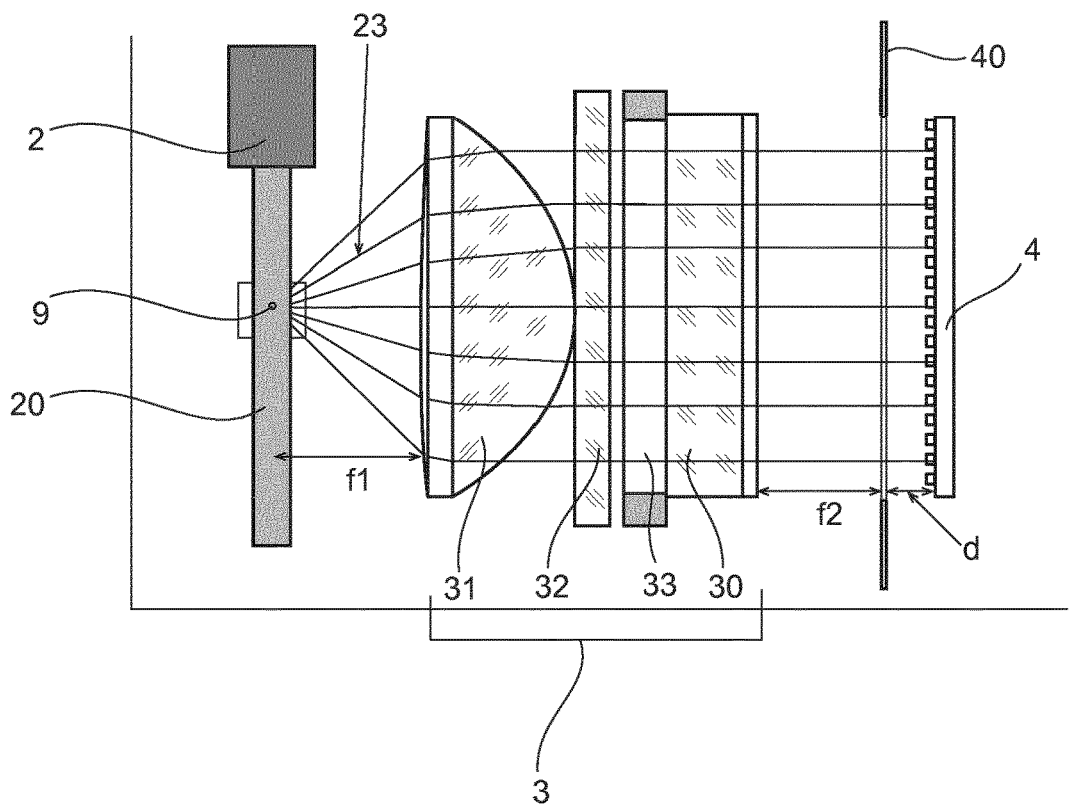
FIG. 4b is a detailed horizontal cut view of the device of FIG. 3.

The device of the invention is described above for the detection and/or morphologic analysis of aerosols particles 9 present in a flow of gas, for example in an airflow, formed by a nozzle 1. In embodiments, illustrated by way of example in FIGS. 3, 4a and 4b, the device of the invention is configured for detecting and/or analysing the morphology of fluid-borne particles present in a fluid, i.e. in a gas or in a liquid, whereas the fluid is preferably transparent to laser light. The device of the invention as illustrated by way of illustrating but in no way limiting examples in FIGS. 3, 4a and 4b, is for example configured for detecting and/or analysing the morphology of water-borne particles. Accordingly, the device of the invention comprises a fluid guide, for example a linear tube 10, along which, for example inside which, a fluid 11 flows, which potentially bears particles 9. The intersection of the beam 20 of laser light with the fluid 11 defines a measurement volume in which the individual fluid-borne particles 9 scatter laser light as they cross the beam 20. The other elements of the device of the invention and their functions are the same as the ones described above in relation with the detection and/or analysis of airborne particles, the only difference being the means for producing and guiding the flow of fluid along a fluid flow path. Unless specified, same reference signs designate same elements in the various figures.

In the following paragraphs, the functioning of the device of the invention and the corresponding method for detecting and/or analysing fluid-borne particles is described and illustrated for the special case of the detection and analysis of airborne particles. The functioning and method described herein however applies to the detection and/or analysis of any fluid-borne particle with an appropriate device according to the invention, i.e. with a device of the invention comprising means for producing a flow of fluid along a fluid flow path adapted to the nature of the fluid.

With reference to the FIGS. 5a to 5c, as an individual particle 9 crosses the laser beam 20 in the measurement volume along the flow direction y, for example travelling down vertically, the image 90 created by the device of the invention, in particular by the lens set 3, also moves in a direction parallel to the flow direction y, for example in the opposite direction. According to the illustrated examples, the speed of the image 90 is directly related to the speed of the particle 9 by the formula:

$$Vi = -Vg \times f1/f2$$

where Vi is the speed of the image 90, Vp is the speed of the fluid-borne particle 9, f1 is the focal distance of the imaging system on the side of the measurement volume, corresponding for example to the focal distance of the plano-convex spherical optical lens 31 and f2 is the focal distance of the imaging system on the side of the photodetector 4, corresponding for example to the focal distance of the plano-convex cylindrical optical lens 30.

The multipixel linear photodetector 4, consisting for example of an array of photomultipliers, photodiodes, silicon photomultiplier, or any other appropriate photodetector 4, acquires the light intensities and converts it into an electric current. The time response t of the photodetector 4 is preferably much shorter than the time of crossing the laser beam 20 by individual particles 9:

$$t<<D/Vpm$$

Where D is the dimension of the laser beam 20 in the flow direction y, for example the vertical dimension of the laser beam 20, and Vpm is the maximum speed of fluid-borne particles 9, typically the maximum fluid-flow velocity at the outlet of the injection nozzle 1 or along the tube 10.

With reference to FIG. 6, the current signals generated by the photodetector 4 are for example converted to voltage and amplified by a signal conditioner 41. The time response of the signal conditioner 41 also must be much shorter than the time of crossing the measurement volume by individual particles.

An analog-to-digital convertor 42 samples all voltage signals coming from the signal conditioner 41 in parallel with a sampling frequency fs>10*Vpm/D, i.e. at least 10 times higher than one over the time of crossing the measurement volume for a single particle. This allows having for each pixel of the photodetector 4 a time trace that resolves the passage of the image in front of the photodetector 4 with at least 10 samples. The sampled digital signals are then sent over a data bus to the signal analyser 5, for example for a graphical representation on a display of the image captured by the photodetector 4 during the passage of an individual particle 9 through the measurement volume.

An example of the time-angle diagram is presented in FIG. 7a. For this example, the laser wavelength is 660 nm, the laser dimension in the flow direction, for example its vertical size, is 1.5 mm, the detected particle is a spherical particle with a diameter of 2 μm, f1/f2=1, the particle speed is around 50 m/s, the linear photodetector consists of an array of 24 pixels, each pixel being having a width of 1 mm and with a gap of 1 mm between adjacent pixels.

The diagram shows how the Mie scattering pattern generated by the particle crossing the measurement volume is seen by the photodetector 4. For a perfectly spherical particle, each pixel of the photodetector will measure a Gaussian profile corresponding to the laser intensity distribution in the vertical plane, the laser beam being supposed to have a Gaussian light distribution profile over its section. The signal amplitude of each individual pixel depends on the corresponding scattering angle and can be even equal to zero. However the sum of the pixels over all time traces, whose trace is represented for example in FIG. 7b, gives a representative signal to determine the speed of the particle within the measurement volume by estimating the full width of half-maximum of the resulting trace.

Figure 8A:
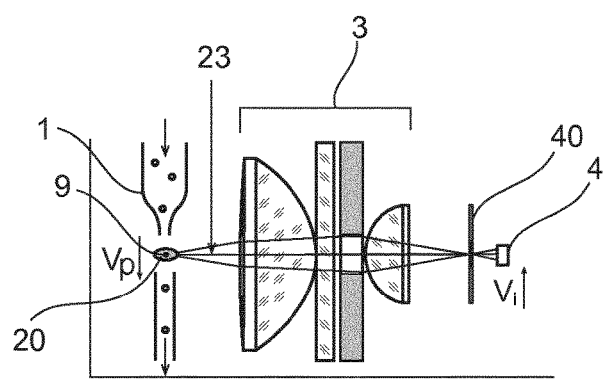
Figure 8D:
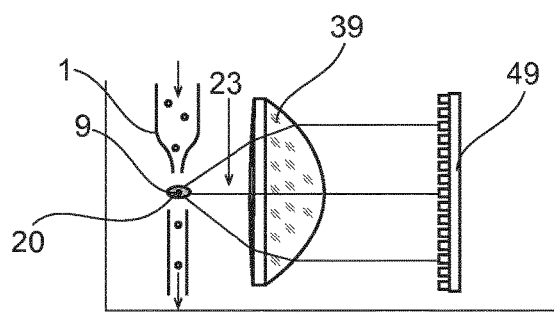
Figure 8B:
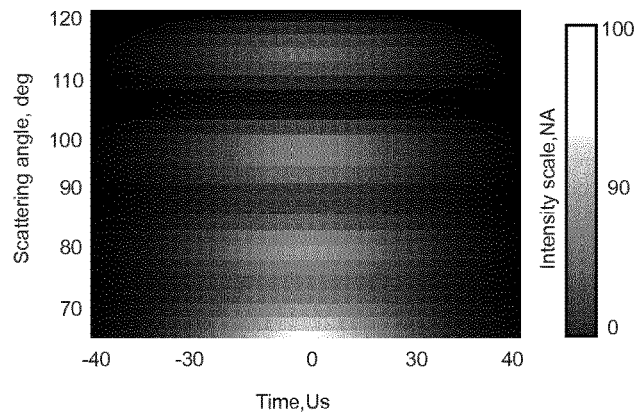
Figure 8E:
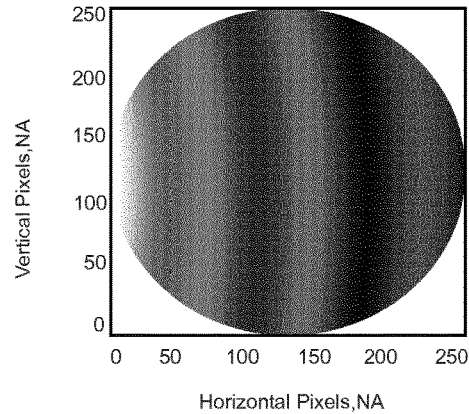
Figure 8C:
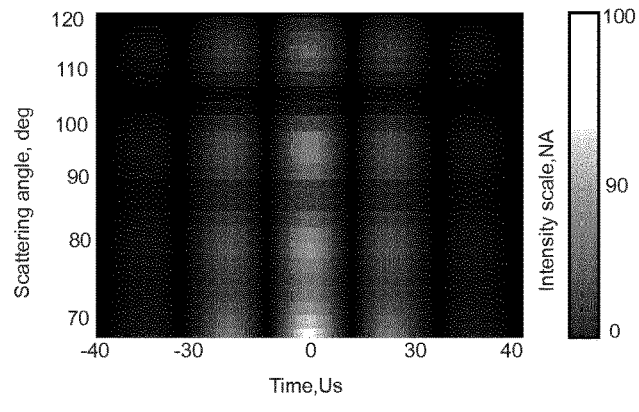
Figure 8F:
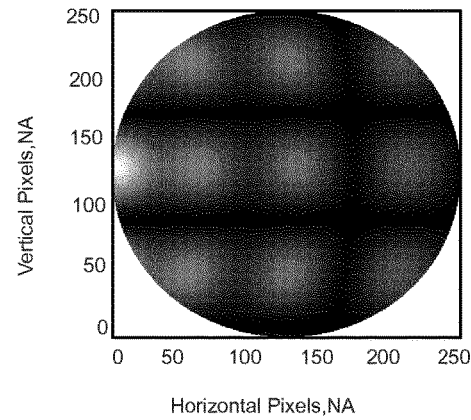

The device of the invention further allows accurately representing the surface structure of individual particles crossing the measurement volume by representing the images acquired over time in a 2D representation. FIGS. 8a to 8f for example show the correspondence between the time-resolved scattering diagrams obtained by a device according to the invention, as illustrated for example in FIG. 8a, and static 2D patterns acquired by a prior art device with a two-dimensional photodetector, as illustrated for example in FIG. 8d. FIG. 8d schematically illustrates a set-up for two-dimensional Mie pattern acquisition containing a spherical lens 39 with its focal point conjugated with the center of the measurement volume, and a two-dimensional photodetector 49, for example a square photodetector with a resolution of 156×156 pixels, the size of the detector being chosen to fit the dimension of the lens 39. In the case of a spherical 2 μm size particle crossing the corresponding measurement volume, the two-dimensional Mie pattern taken at 90 degrees to the direction of the laser beam, illustrated in FIG. 8e, will contain only vertical structures having an arced shape. The same particle crossing the measurement volume of a device according to the invention will produce the time-angle scattering diagram presented at FIG. 8b. A non-spherical particle will produce a two-dimensional Mie pattern image further containing oscillations, or ripples, along the vertical axis, as visible in FIG. 8f. These ripples will appear also on the time-angle diagram, as illustrated in FIG. 8c, but they will be expressed by oscillations on the time axis due to the movement of the image relative to the linear detector.

The device of the invention thus allows determining the speed of individual particles through the measurement volume thanks to a high sampling speed of the scattered light 23 and a slightly offset photodetector 4, and further allows obtaining an accurate representation of the surface and structure of the particles, while using a single laser and a simpler photodetector than prior art imaging devices. The sampling rate of scattered light by the photodetector is for example higher or equal to one MSPS (Mega Sample Per Second), preferably higher or equal to 5, 10 or even 25 MSPS.

The invention claimed is:
1. Measurement device for the detection or analysis of fluid-borne particles, the measurement device comprising:
   a nozzle (1, 1') for producing a flow of fluid along a fluid flow path,
   a laser (2) positioned for emitting a beam (20) of laser light in a measurement volume across the fluid flow path;
   a lens set (3) for collecting laser light (23) scattered in the measurement volume by fluid-borne particles (9) contained in the flow of fluid, wherein the lens set is positioned with a longitudinal axis parallel to the fluid flow path,
   a photo-detector (4) positioned at a non-zero distance from a focal distance (f2) beyond the lens set for the detection of scattered laser light (23) collected by the lens set (3), and
   a second photodetector (6) for detecting the laser beam (20) emitted by the laser (2) beyond the measurement volume,
   wherein:
   the lens set (3) is configured to focus the collected scattered light (23) through to a line at the focal distance (f2) beyond the lens set (3), said line being aligned by a plano-convex cylindrical optical lens (30) of the lens set (3) to be perpendicular to a flow direction (y) of the flow of fluid in said measurement volume, the rays of scattered light being focused by the lens set (3) and kept parallel to each other in a plane perpendicular to the flow direction (y);

the photo-detector (4) is a multipixel detector for capturing the scattered laser light focused by the lens set (3), wherein said multipixel detector (4) is oriented with its longitudinal axis parallel to said line.

2. Measurement device according to claim 1, wherein said means for producing a flow of fluid is a nozzle for producing a laminar flow of air with a flow path beyond the nozzle or comprises a tube for producing a flow of liquid with a flow path along said tube.

3. Measurement device according to claim 1, wherein said laser is configured for emitting said laser beam (20) polarized in said flow direction (y).

4. Measurement device according to the claim 3, further comprising a beam linear polarizer (21) positioned in the path of the laser beam (20) between the laser (2) and the measurement volume to allow only linear polarization of the laser light in the flow direction (y) to reach the measurement volume.

5. Measurement device according to claim 1, wherein the plano-convex cylindrical optical lens (30) is positioned for focusing the scattered light (23) in a direction parallel to said flow direction (y) and for leaving the rays of the scattered light (23) unchanged in a direction perpendicular to said flow direction (y).

6. Measurement device according to claim 5, wherein the lens set (3) further comprises a plano-convex spherical optical lens (31) positioned between the measurement volume and the plano-convex cylindrical optical lens, such that the focal point of said plano-convex spherical optical lens (31) is located in the measurement volume.

7. Measurement device according to claim 6, further comprising a scattered light linear polarizer (32) positioned between the plano-convex spherical optical lens (31) and the plano-convex cylindrical optical lens (30) for keeping only parallel component light from the scattered light collected by the plano-convex spherical optical lens (31).

8. Measurement device according to claim 6, further comprising a first diaphragm (33) positioned between the plano-convex spherical optical lens (31) and the plano-convex cylindrical optical lens (30) for avoiding range effects of the plano-convex spherical and cylindrical optical lenses (31, 30) or for avoiding parasite light to be collected by the plano-convex cylindrical optical lens (30).

9. Measurement device according to claim 1, wherein said photodetector (4) is configured to sample said scattered laser light focused by said lens set (3) at a sampling interval at least ten times shorter than the time of crossing the measurement volume by an individual fluid-borne particle of the smallest size measured by the measurement device or than a travel time of the fluid in the measurement volume, said travel time corresponding to a size of the laser beam (20) in the measurement volume in the flow direction (y), divided by a speed of the fluid flow in the measurement volume.

10. Measurement device according to claim 1, wherein said photo-detector (4) is configured to sample said scattered laser light focused by said lens set (3) at a sampling rate higher or equal to one MSPS (Mega Sample Per Second).

11. Measurement device according to claim 1, further comprising a second diaphragm (40) positioned between said lens set (3) and said photo-detector (4) for avoiding parasite light from being captured by said photo-detector (4).

12. Measurement device according to claim 1, wherein the photodetector (4) is a linear multipixel detector.

13. Measurement method for the detection or analysis of fluid-borne particles, comprising the steps of:
producing a flow of fluid along a fluid flow path, said flow of fluid potentially containing fluid-borne particles (9) to be detected;
emitting a beam (20) of laser light in a measurement volume across the fluid flow path;
collecting and focusing laser light (23) scattered in the measurement volume by fluid-borne particles (9) contained in the flow of fluid with a lens set positioned with a longitudinal axis parallel to the fluid flow path, said collected scattered light being focused to a line to a focal distance (f2) beyond the lens set (3), said line being aligned by a plano-convex cylindrical optical lens (30) of the lens set to be perpendicular to a flow direction (y) of the flow of fluid in said measurement volume, the rays of the collected scattered light (23) being focused by the lens set to be parallel to each other in a plane perpendicular to the flow direction (y);
capturing the collected and focused scattered laser light (23) with a linear multipixel photodetector (4) positioned at a non-zero distance from the focal distance (12) and oriented with its longitudinal axis parallel to said line at the focal distance (f2); and
repeating the steps of emitting, collecting and capturing a plurality of times during the time of crossing the measurement volume by an individual fluid-borne particle (9).

14. Measurement method according to claim 13, wherein said flow of fluid is a laminar flow of air or a flow of liquid.

15. Measurement method according to claim 13, wherein said beam (20) of laser light is polarized in said flow direction (y).

16. Measurement method according to claim 13, wherein said steps of emitting, collecting and capturing are repeated at least ten times during the time of crossing the measurement volume by an individual fluid-borne particle (9).

17. Measurement method according to claim 13, wherein said steps of emitting, collecting and capturing are repeated at a sampling rate higher or equal to one MSPS (Mega Sample Per Second).

18. Measurement method according to claim 13, wherein scattered laser light (23) captured during the crossing of the measurement volume by a fluid-borne particle (9) is further used for determining at least one of a size of the fluid-borne particle (9), a speed of the fluid-borne particle (9) across the measurement volume, a shape of the fluid-borne particle (9), and a surface quality of the fluid-borne particle (9).

* * * * *